(12) United States Patent
Fu et al.

(10) Patent No.: US 12,720,511 B2
(45) Date of Patent: Aug. 25, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 418 days.

(21) Appl. No.: 18/224,289

(22) Filed: Jul. 20, 2023

(65) Prior Publication Data

US 2023/0371011 A1 Nov. 16, 2023

Related U.S. Application Data

(63) Continuation of application No. PCT/CN2021/091125, filed on Apr. 29, 2021.

(51) Int. Cl.
*H04W 72/0453* (2023.01)

(52) U.S. Cl.
CPC ............................... *H04W 72/0453* (2013.01)

(58) Field of Classification Search
CPC . H04W 72/0453; H04W 48/18; H04W 48/20; H04W 72/563
See application file for complete search history.

(56) References Cited

U.S. PATENT DOCUMENTS

2019/0174406 A1* 6/2019 Hwang ................. H04W 48/20
2020/0120547 A1 4/2020 Han et al.
(Continued)

FOREIGN PATENT DOCUMENTS

CN 107708109 A 2/2018
CN 108513322 A 9/2018
(Continued)

OTHER PUBLICATIONS

3GPP TSG RAN WG2 Meeting #113bis-e R2-2102696, E-Conference, Apr. 12-20, 2021, Agenda item: 8.8.2, Source: Qualcomm Incorporated, Title: Slice specific cell reselection, WID/SID: FS_NR_slice—Release 17, Document for: Discussion and Decision. 9 pages.

(Continued)

*Primary Examiner* — Yu-Wen Chang
(74) *Attorney, Agent, or Firm* — BAYES PLLC

(57) ABSTRACT

A wireless communication method and device are provided. The method comprises: for the same slicing and the same frequency point, determining a first frequency point priority of the frequency point according to a first rule, wherein the first rule comprises any one of the following: determining the first frequency point priority according to a network indication or a predefined mode; determining, by means of frequency points, the first frequency point priority on the basis of frequency point priorities of different cells; determining, by means of frequency points, the first frequency point priority on the basis of virtual frequency point priorities of different cells; and determining a traditional frequency point priority of the frequency point to be the first frequency point priority.

8 Claims, 4 Drawing Sheets

For a same slice and a same frequency point, the terminal device determines a first frequency point priority of the frequency point according to a first rule, wherein the first rule includes, but is not limited to, any one of: determining the first frequency point priority according to a network indication or a predefined manner; determining the first frequency point priority according to frequency point priorities of the frequency point based on different cells; determining the first frequency point priority according to virtual frequency point priorities of the frequency point based on different cells; or determining a conventional frequency point priority of the frequency point as the first frequency point priority

S510

The terminal device performs cell reselection according to the first frequency point priority

S520

(56) References Cited

U.S. PATENT DOCUMENTS

| | | | | |
|---|---|---|---|---|
| 2020/0305071 | A1 | 9/2020 | Liu | |
| 2022/0150904 | A1 * | 5/2022 | Santhanam | H04W 36/0085 |
| 2023/0056855 | A1 * | 2/2023 | Jiang | H04W 36/302 |
| 2023/0247685 | A1 * | 8/2023 | Choe | H04W 76/10 370/329 |
| 2024/0007919 | A1 * | 1/2024 | Liu | H04W 48/18 |
| 2024/0023168 | A1 * | 1/2024 | Gao | H04W 48/20 |
| 2024/0073754 | A1 * | 2/2024 | Bulakci | H04W 36/0072 |
| 2024/0121710 | A1 * | 4/2024 | Cheng | H04W 48/20 |
| 2024/0163742 | A1 * | 5/2024 | Ishii | H04W 36/24 |

FOREIGN PATENT DOCUMENTS

| | | |
|---|---|---|
| CN | 109246775 A | 1/2019 |
| CN | 111491309 A | 8/2020 |
| WO | 2019119377 A1 | 6/2019 |

OTHER PUBLICATIONS

3GPP TSG-RAN2 #113e meeting R2-2100489, Online, Jan. 25-Feb. 5, 2021, Agenda Item: 8.8.2, Source: Xiaomi, Title: Cell (re)selection based on preferred frequency(s) per slice, Document for: Discussion and Decision. 5 pages.

3GPP TSG-RAN WG2 Meeting #113 Electronic R2-2100547, Jan. 25-Feb. 5, 2021, Agenda item: 8.3.2, Source: Nokia, Nokia Shanghai Bell, Title: Discussion on cell selection and reselection for slicing, WID/SID: FS_NR_slice—Release 17, Document for: Discussion and Decision. 7 pages.

International Search Report in the international application No. PCT/CN2021/091125, mailed on Jan. 26, 2022. 6 pages with English translation.

Written Opinion of the International Search Authority in the international application No. PCT/CN2021/091125, mailed on Jan. 26, 2022. 6 pages with English translation.

3GPP TS 38.304 V16.1.0 (Jul. 2020), 3rd Generation Partnership Project; Technical Specification Group Radio Access Network; NR; User Equipment (UE) procedures in Idle mode and RRC, Inactive state (Release 16). 37 pages.

"3rd Generation Partnership Project; Technical Specification Group RAN; NR; Study on enhancement of Radio AccessNetwork (RAN) slicing (Release 17)", 3GPP Standard; Technical Report; 3GPP TR 38.832, 3rd Generation Partnership Project(3GPP), Mobile Competence Centre ; 650, Route Des Lucioles ; F-06921 Sophia-Antipolis Cedex ; France vol. RAN WG2, No. v1.0.0, Mar. 14, 2021 (Mar. 14, 2021),XP051999995, paragraph 5.1.1, Figure 5.1.1-1, 31 pages.

"3rd Generation Partnership Project; Technical Specification Group Radio Access Network; NR; User Equipment (UE) procedures in Idle mode and RRC Inactive state (Release 16)", 3GPP Standard; Technical Specification; 3GPP TS 38.304, France vol. RAN WG2, No. V16.4.0, Mar. 29, 2021 (Mar. 29, 2021), XP052000243, paragraph 5.2.3.2, paragraph 5.2.4.1 , paragraph 5.2.4.2, 39 pages.

Partial Supplementary European Search Report in the European application No. 21938400.5, mailed on Mar. 18, 2024, 19 pages.

"3rd Generation Partnership Project; Technical Specification Group Radio Access Network; NR; User Equipment (UE) procedures in Idle mode and RRC Inactive state (Release 16)", 3GPP TS 38.304 V16.3.0 (Dec. 2020), the whole document, 37 pages.

Supplementary European Search Report in the European application No. 21938400.5, mailed on Jun. 11, 2024. 18 pages.

Second Office Action of the Chinese application No. 202311428958.6, issued on Apr. 23, 2025. 8 pages with English translation.

First Office Action of the Chinese application No. 202311428958.6, issued on Jan. 17, 2025. 12 pages with English translation.

* cited by examiner

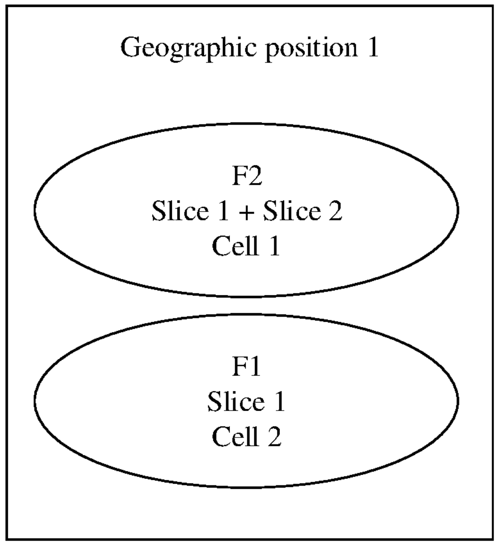
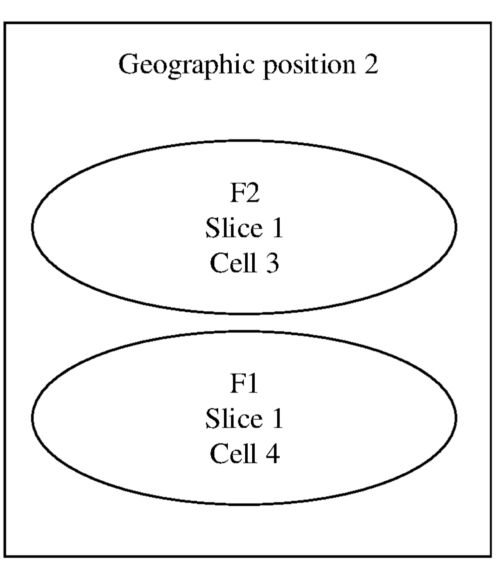
FIG. 3
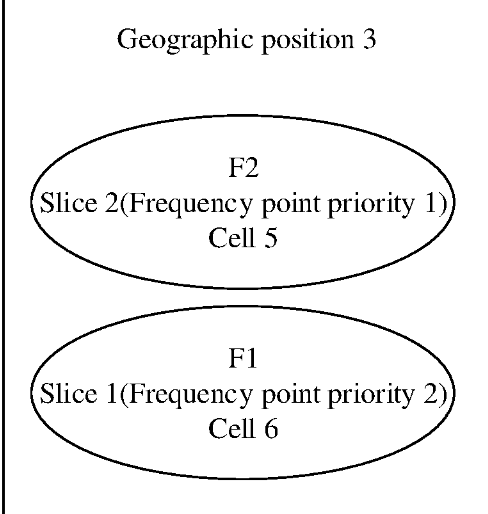
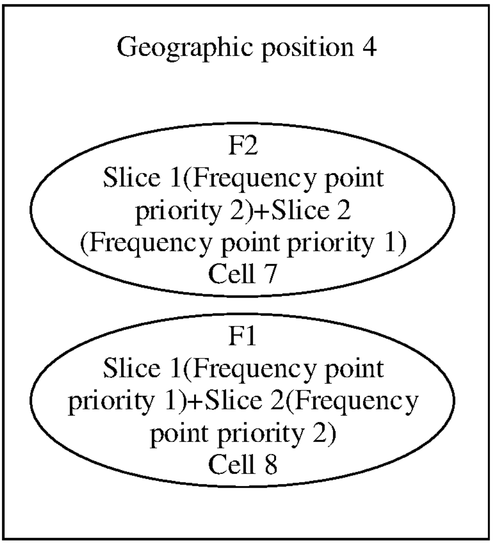
FIG. 4

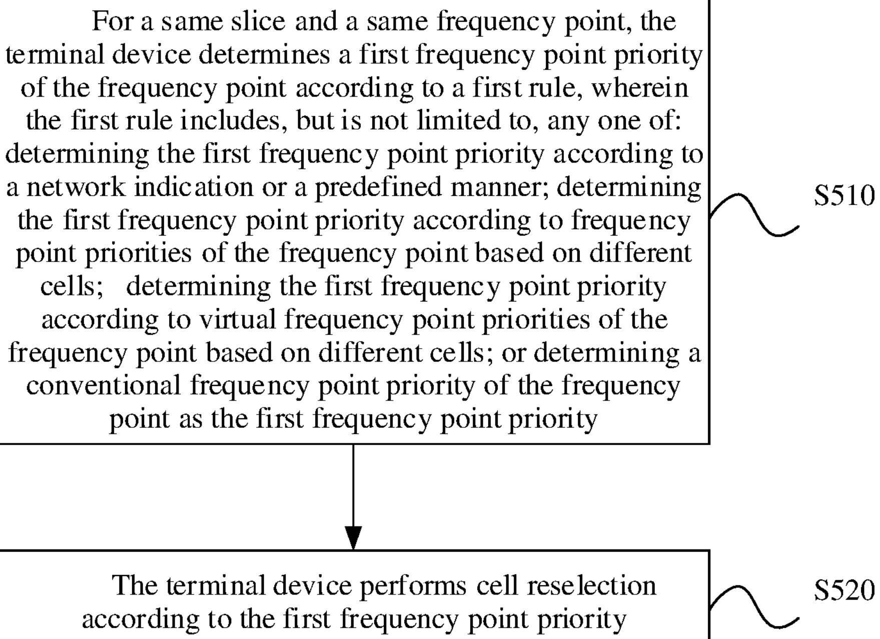

FIG. 5

For different slices, a same first frequency point and different cells, the terminal device performs cell reselection according to a second rule, wherein the second rule includes any one of: when performing the cell reselection, excluding a non-specific cell, wherein the non-specific cell is a cell not supporting a target slice; when performing the cell reselection, setting a reselection priority of the non-specific cell to be different from a reselection priority of a specific cell, wherein the specific cell is a cell supporting the target slice; or performing the cell reselection according to a conventional frequency point priority of the first frequency point.

Terminal device 700

Processing unit 710

FIG. 7

WIRELESS COMMUNICATION METHOD AND DEVICE

CROSS-REFERENCE TO RELATED APPLICATION

The present application is a continuation of International Application No. PCT/CN2021/091125 filed on Apr. 29, 2021 and entitled "WIRELESS COMMUNICATION METHOD AND DEVICE", the disclosure of which is hereby incorporated by reference in its entirety.

BACKGROUND

Network slicing (i.e., slice) is deployed in a 5G network. At present, there are following several scenarios in the 5G network. 1. Slices supported by different frequency points are the same or different. 2. For a same slice, frequency point priorities of different frequency points are the same or different. 3. Slices supported by a same frequency point are the same or different. That is, for the same frequency point, slices supported by different cells are the same or different. 4. For the same slice, frequency point priorities of the same frequency point are the same or different. That is, for the same slice, reselection priorities of different cells at the same frequency point are the same or different.

For the above-mentioned fourth scenario, i.e., for the same slice, the reselection priorities of the different cells at the same frequency point are the same or different, how to unify the priorities of the frequency point is an urgent technical problem to be solved in the present disclosure.

SUMMARY

Embodiments of the present disclosure provide a wireless communication method and a device. Therefore, for a same slice and a same frequency point, a terminal device determines a first frequency point priority of the frequency point according to a first rule.

In a first aspect, there is provided a method for wireless communication, and the method includes the following operations. For a same slice and a same frequency point, a first frequency point priority of the frequency point is determined according to a first rule. The first rule includes: determining the first frequency point priority according to frequency point priorities of the frequency point based on different cells.

In a second aspect, there is provided a wireless communication method, which includes the following operations. For different slices, a same first frequency point and different cells, cell reselection is performed according to a second rule. The second rule includes: performing the cell reselection according to a conventional frequency point priority of the first frequency point.

In a third aspect, there is provided a terminal device configured to perform the method in the first aspect, the second aspect or various implementations thereof.

BRIEF DESCRIPTION OF THE DRAWINGS

FIG. 3 is a schematic diagram of a slice deployment scenario.

FIG. 4 is a schematic diagram of another slice deployment scenario.

FIG. 5 is a flowchart of a wireless communication method provided by an embodiment of the present disclosure.

FIG. 6 is a flowchart of another wireless communication method provided by an embodiment of the present disclosure.

FIG. 7 shows a schematic block diagram of a terminal device 700 according to an embodiment of the present disclosure.

DETAILED DESCRIPTION

Technical solutions of the embodiments of the present disclosure will be described below in conjunction with the drawings in the embodiments of the present disclosure, and it is apparent that the described embodiments are part of the embodiments of the present disclosure, but not all of the embodiments of the present disclosure. With respect to the embodiments in the present disclosure, all other embodiments obtained by those of ordinary skill in the art without making creative efforts fall within the scope of protection of the present disclosure.

Embodiments of the present disclosure can be applied to various communication systems, such as: Global System of Mobile communication (GSM) systems, Code Division Multiple Access (CDMA) systems, Wideband Code Division Multiple Access (WCDMA) systems, General Packet Radio Service (GPRS), Long Term Evolution (LTE) systems, Advanced long term evolution (LTE-A) systems, New Radio (NR), evolution systems of NR systems, and LTE-based access to unlicensed spectrum (LTE-U) systems, NR-based access to unlicensed spectrum (NR-U) systems on unlicensed spectrum, Universal Mobile Telecommunications Systems (UMTS), Wireless Local Area Networks (WLAN), Wireless Fidelity (WiFi), next generation communication systems or other communication systems.

In general, conventional communication systems support a limited number of connections and are easy to implement. However, with the development of communication technology, mobile communication systems will not only support conventional communication, but also support, for example, Device to Device (D2D) communication, Machine to Machine (M2M) communication, Machine Type Communication (MTC), Vehicle to Vehicle (V2V) communication, etc. Embodiments of the present disclosure can also be applied to these communication systems.

In an embodiment, the communication system in the embodiment of the present disclosure can be applied to a Carrier Aggregation (CA) scenario, a Dual Connectivity (DC) scenario, and a Standalone (SA) network distribution scenario.

There is no limitation to the applied spectrum in the embodiments of the present disclosure. For example, embodiments of the present disclosure may be applied to licensed spectrum or unlicensed spectrum.

Figure 1:
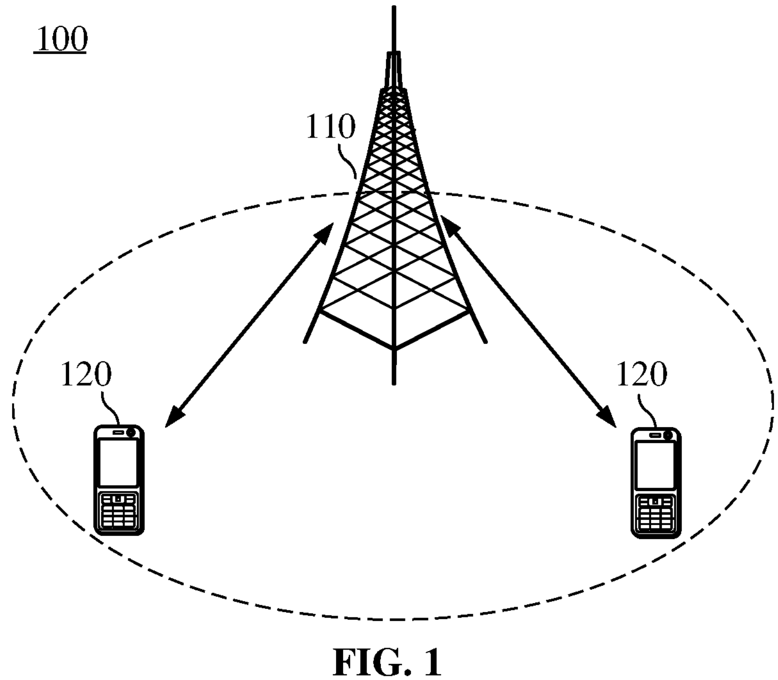
FIG. 1 is a schematic diagram of the architecture of a communication system provided by an embodiment of the present disclosure.

Exemplarily, a communication system 100 to which the embodiments of the present disclosure are applied is shown in FIG. 1. The communication system 100 may include a network device 110 which may be a device that communicates with a terminal device 120 (or referred to as a communication terminal or a terminal). The network device 110 may provide communication coverage for a particular geographic area and may communicate with terminal devices located within the coverage area.

FIG. 1 exemplarily illustrates one network device and two terminal devices. In an embodiment, the communication system 100 may include a plurality of network devices and other numbers of terminal devices may be included within the coverage area of each network device, which is not limited in the embodiments of the present disclosure.

In an embodiment, the communication system 100 may further include other network entities such as network controllers, mobility management entities and the like, which are not limited by embodiments of the present disclosure.

It should be understood that a device having a communication function in a network/system in the embodiments of the present disclosure may be referred to as a communication device. Taking the communication system 100 shown in FIG. 1 as an example, the communication device may include a network device 110 and a terminal device 120 having a communication function, and the network device 110 and the terminal device 120 may be specific devices described above and will not be elaborated here. The communication device may further include other devices in the communication system 100, such as network controllers, mobility management entities and other network entities, which are not limited in the embodiments of the present disclosure.

It should be understood that the terms "system" and "network" herein are often used interchangeably. The term "and/or" herein is only an association relationship describing associated objects, which means that there may be three relationships. For example, "A and/or B" may have three meanings: A exists alone, A and B exist at the same time and B exists alone. In addition, the character "/" herein generally indicates that the associated objects before and after the character "/" are in an "or" relationship.

Embodiments of the present disclosure are described in connection with a terminal device and a network device, wherein the terminal device may also be referred to as a User Equipment (UE), an access terminal, a subscriber unit, a subscriber station, a mobile station, a mobile platform, a remote terminal, a mobile device, a user terminal, a terminal, a wireless communication device, a user agent or a user apparatus, etc. The terminal device may be a STAION (ST) in a WLAN, a cellular telephone, a cordless telephone, a Session Initiation Protocol (SIP) telephone, a Wireless Local Loop (WLL) station, a Personal Digital Processing (PDA) device, a handheld device having a wireless communication function, a computing device or other processing device connected to a wireless modem, a vehicle-mounted device, a wearable device, and a next generation communication system, such as a terminal device in an NR network or a terminal device in a future evolved Public Land Mobile Network (PLMN) network.

By way of example and not limitation in the embodiments of the present disclosure, the terminal device may also be a wearable device. Wearable devices can also be referred to as wearable intelligent devices, which are the general name of wearable devices developed by applying wearable technologies to intelligently designing of daily wear, such as glasses, gloves, watches, clothing and shoes. The wearable device is a portable device that is worn directly on the body or integrated into the user's clothes or accessories. The wearable device is not only a kind of hardware device, but also implements powerful functions through software support, data interaction and cloud interaction. Generalized wearable smart devices include devices, such as smart watches or smart glasses, which have full functions and large size and can realize complete or partial functions without relying on smart phones. Generalized wearable smart devices further include devices, such as various smart bracelets and smart jewelry for monitoring physical signs, which are only focus on certain application functions and need to be used in conjunction with other devices such as smart phones.

The network device may be a device for communicating with a mobile device. The network device may be an Access Point (AP) in a WLAN, a Base Transceiver Station (BTS) in a GSM or CDMA, a base station (NodeB, NB) in a WCDMA, an Evolutional Node B (eNB or eNodeB) in a LTE, a relay station, an Access Point, a vehicle-mounted device, a wearable device, a network device or a base station (gNB) in a NR network or a network device in a future evolved PLMN network, etc.

In the embodiment of the present disclosure, the network device provides services for a cell, and the terminal device communicates with the network device through transmission resources (e.g., frequency domain resources, or spectrum resources) used by the cell. The cell may be a cell corresponding to the network device (e.g., base station), and the cell may belong to a macro base station or a base station corresponding to a Small cell. The Small cell may include a Metro cell, a Micro cell, a Pico cell, a Femto cell, etc. These Small cells have the characteristics of small coverage and low transmission power, and are suitable for providing high-speed data transmission services.

Before introducing the technical solution of the present disclosure, the cell reselection and a radio slicing technology are introduced as follows.

(1) Cell Reselection

In the process of cell selection and reselection performed by the terminal device in a disconnected state (i.e., idle state or inactive state), a cell reselection strategy based on frequency priority (i.e., frequency point priority) is defined in order to meet a load balance in the idle state.

The cell reselection refers to a process of selecting, by the terminal device in the disconnected state, the best cell to provide service signals by monitoring the signal quality of neighboring cells and the current serving cell. When the signal quality and level of a neighboring cell meet an S criterion and certain reselection decision criterion, the terminal device will access the neighboring cell to reside.

After the terminal device successfully resides in the resident cell, the terminal device will continuously measure the cell. The terminal device calculates Srxlev (i.e., S criterion) according to a measurement result of Reference Signal Received Power (RSRP) in an Radio Resource Control (RRC) layer, and takes a comparison result of the Srxlev with Sintrasearch (i.e., a start threshold of the intra-frequency measurement) and Snonintrasearch (i.e., a start threshold of inter-frequency/different system measurement) as a determination condition of whether to start measurement on the neighboring cell.

In the cell reselection of the intra-frequency or inter-frequency with the same frequency priority, an R criterion is adopted for performing the cell reselection. That is, signal qualities of the cells are sorted, and a cell with the best signal quality is selected as a candidate target cell for the reselection. For a cell with a high frequency priority, as long as the signal quality of the cell meets a certain threshold, the cell with the high frequency priority is reselected. For a cell with a low frequency point priority, the cell will be reselected only when a signal quality of the serving cell is lower than a certain threshold.

(2) Radio Slicing Technology

Figure 2:
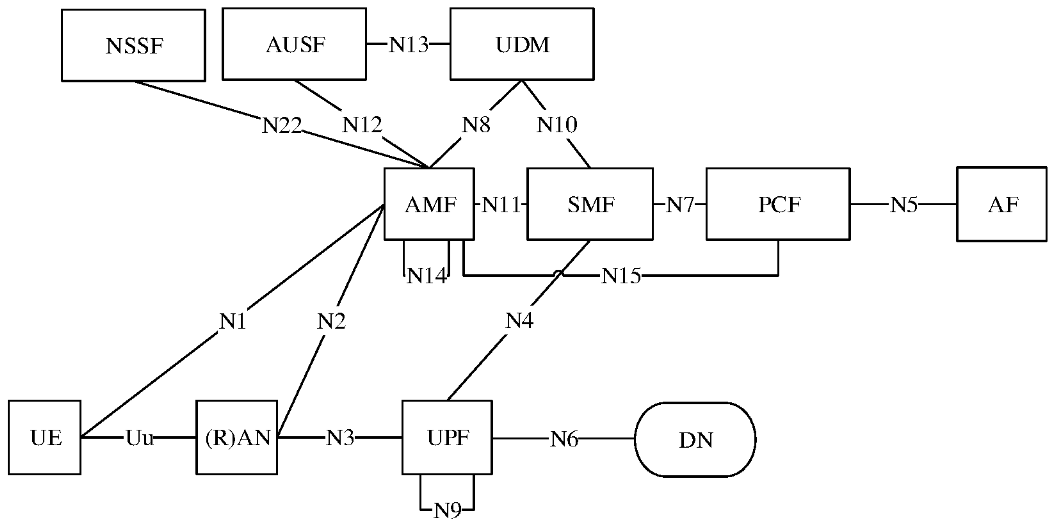
FIG. 2 is an architecture diagram of a 5G network system.

Network slicing is deployed in the 5G network. FIG. 2 is an architecture diagram of the 5G network system. As shown in FIG. 2, the 5G network system mainly includes UE, an Access Network (AN) device, Access and Mobility Management Function (AMF) entities, a Session Management Function (SMF) entity, User Plane Function (UPF) entities, a Policy Control function (PCF) entity, a Unified Data Management (UDM) entity, a Data Network (DN), and an Application Function (AF) entity, a Authentication Server Function (AUSF) entity, and a Network Slice Selection Function (NSSF) entity.

Specifically, in the 5G network system, the UE is connected with the AN device in the Access Stratum (AS) through an Uu interface, so as to perform interaction of AS messages and wireless data transmission; and the UE is connected with the AMF entities in the Non-Access Stratum (NAS) through an N1 interface, so as to perform interaction of NAS messages. The AN device is connected with the AMF entities through an N2 interface, and the AN device is connected with the UPF entities through an N3 interface. A plurality of UPF entities are connected with each other through an N9 interface, the UPF entities are connected with the DN through an N6 interface, and at the same time, the UPF entities are connected with the SMF entity through an N4 interface. The SMF entity is connected with the PCF entity through an N7 interface, the SMF entity is connected with the UDM entity through an N10 interface, the SMF entity controls the UPF entities through the N4 interface, and meanwhile, the SMF entity is connected with the AMF entities through the N11 interface. A plurality of AMF entities are connected with each other through an N14 interface, the AMF entities are connected with the UDM entity through an N8 interface, the AMF entities are connected with the AUSF entity through an N12 interface, the AMF entities are connected with the NSSF entity through an N22 interface, and meanwhile, the AMF entities are connected with the PCF entity through an N15 interface. The PCF entity is connected with the AF entity through an N5 interface. The AUSF entity is connected to the UDM entity through an N13 interface.

In the communication system, the UDM entity is a subscription database in a core network, and stores subscription data of users in the 5G network. The AMF entity is a mobility management function in the core network, and the SMF entity is a session management function in the core network. The AMF entity is responsible for forwarding messages related to session management between the UE and the SMF entity in addition to mobility management for the UE. The PCF entity is a policy management function in the core network, and is responsible for formulating policies related to the mobility management, session management, billing and the like for UE. The UPF entity is a user plane function in the core network, and performs data transmission with external data network through the N6 interface and performs data transmission with the AN device through the N3 interface. After the UE accesses the 5G network through the Uu port, the Protocol Data Unit (PDU) session data connection between the UE and the UPF entity is established under the control of the SMF entity, so as to perform data transmission. The AMF entity and the SMF entity obtain user subscription data from the UDM entity through the N8 and N10 interfaces, respectively, and obtain policy data from the PCF entity through the N15 and N7 interfaces, respectively.

In addition, there is Network Exposure Function (NEF) entity in the 5G network system, and the NEF entity is used to interface with third-party application servers and transmit information between the core network node and the third-party applications.

It should be understood that slices can be identified using Single Network Slice Selection Assistance Information (S-NSSAI). The collection of S-NSSAI constitutes Network Slice Selection Assistance Information (NSSAI).

The slice acquisition process will be explained in conjunction with FIG. 2.

When the UE needs to use a slice, the UE can transmit a Registration request to the AMF. The Registration request includes a NSSAI request, which can carry an S-NSSAI of the slice requested by the UE.

The AMF determines the Allowed NSSAI according to the UE subscription and a coverage where the network slicing is deployed, and carries the Allowed NSSAI in a Registration accept and transmits the Registration accept to the UE, and also carries the Allowed NSSAI in an N2 message and transmits the N2 message to the base station.

After receiving the Allowed NSSAI, the UE needs to establish a Packet Data Unit (PDU) session in the slice corresponding to the S-NSSAI. Only after the PDU session is established can the UE transmit and receive data.

It should be understood that the coverage of each slice may be different during network deployment. When determining the Allowed NSSAI, the AMF needs to ensure that all slices identified by the Allowed NSSAI can cover a Registration Area allocated by the AMF to the UE, i.e., a Tracking Area (TA) list. The AMF obtains the S-NSSAI supported by the base station and the corresponding TA from the base station through an NG setup request or RAN configuration update signaling, thereby determining the Allowed NSSAI.

It should be understood that the NAS layer of the UE will provide the Allowed NSSAI to the AS layer. In the Release (R) 17, the UE in the disconnected state can obtain, from the read system information of the cell, slice information supported by the base station and the frequency point priority of each frequency point with consideration of the slice. In combination with the Allowed NSSAI and the read system information, the UE can select a cell that supports the Allowed NSSAI, supports UE services and has a high frequency point priority, so as to prepare for subsequent service transmission.

It should be understood that the UE selects a cell that can support UE services and has a high frequency point priority. Possible scenarios are, but are not limited to, the following scenarios.

1. Slices supported by different frequency points are the same or different. As shown in a column of drawings on the right side of FIG. 3, slices supported by a frequency point F1 and a frequency point F2 are both a slice 1, it indicates that the slices supported by different frequency points are the same. As shown in a column of drawings on the left side of FIG. 4, the slice supported by the frequency point F1 is the slice 1, and the slice supported by the frequency point F2 is a slice 2, it indicates that slices supported by different frequency points are different.
2. For a same slice, frequency point priorities of different frequency points are the same or different. As shown in drawings on the right side of FIG. 4, for the same slice 1, a frequency point priority of the frequency point F1 is different from a frequency point priority of the frequency point F2.

3. Slices supported by the same frequency point are the same or different. That is, for the same frequency point, slices supported by different cells are the same or different. As shown in the drawings at the bottom row of FIG. 3, for the same frequency point F1, slices supported by a cell 2 and a cell 4 are both the slice 1, it indicates that for the same frequency point, slices supported by different cells are the same. As shown in the drawings at the upper row of FIG. 3, for the same frequency point F2, slices supported by the cell 1 are the slice 1 and the slice 2, and the slice supported by a cell 3 is the slice 1, which indicates that for the same frequency point, the slices supported by different cells are not exactly the same.
4. For the same slice, frequency point priorities of the same frequency point are the same or different. That is, for the same slice, reselection priorities for a same frequency point and different cells are the same or different. Assuming that a frequency point priority 2 is higher than a frequency point priority of 1, as shown in the upper row of FIG. 4, for the same slice 2, a frequency point priority of the frequency point F2 in a cell 5 and in a cell 7 is 1, it indicates that for the same slice, the frequency point priorities of the same frequency point are the same. As shown in the drawings at the bottom row of FIG. 4, for the same slice 1, a frequency point priority of the frequency point F1 in a cell 6 is 2, and the frequency point priority of the frequency point F1 in the cell 7 is 1, it indicates that for the same slice, the frequency point priorities of the same frequency point are different.

For the above-mentioned fourth scenario, i.e., for the same slice, reselection priorities of different cells at the same frequency point are the same or different, how to unify the frequency point priorities of the frequency point is an urgent technical problem to be solved in the present disclosure.

To solve this technical problem, the present disclosure provides a first rule to determine a frequency point priority of a frequency point.

The technical solution of the present disclosure will be described in detail below.

FIG. 5 is a flowchart of a wireless communication method provided by an embodiment of the present disclosure, and the method may be performed by a terminal device. As shown in FIG. 5, the method includes the following flows.

At S510: For a same slice and a same frequency point, the terminal device determines a first frequency point priority of the frequency point according to a first rule. The first rule includes, but is not limited to, any one of the followings.

1. The first frequency point priority is determined according to a network indication or a predefined manner.
2. The first frequency point priority is determined according to frequency point priorities of the frequency point based on different cells.
3. The first frequency point priority is determined according to virtual frequency point priorities of the frequency point based on different cells.
4. A conventional frequency point priority of the frequency point is determined as the first frequency point priority.

At S520 (optional): The terminal device performs cell reselection according to the first frequency point priority.

In an embodiment, the first frequency point priority is also referred to as the frequency point priority of the frequency point based on the slice.

In an embodiment, the terminal device can obtain slice related information from the network device, and the slice related information includes at least one of: slices supported by the network device, and frequency point priorities of the frequency point when the slice is considered. For example, the frequency point priorities of the frequency point are the frequency point priorities for the same slice, the same frequency point and different cells.

In an embodiment, the number of slices is one or more. If there are multiple slices, the multiple slices can be referred to as a slice group.

In an embodiment, the slice is of any of following levels, but is not limited thereto: cell, frequency point, tracking area or registration area.

In an embodiment, the slice can be identified by any one of the following, but is not limited to thereto: an index of the slice, an identification, a Slice/Service Type (SST), a cell group identification, and parameters corresponding to the slice.

In an embodiment, for the same slice, the same frequency point and different cells, the terminal device can determine the first frequency point priority of the frequency point according to the first rule.

It should be understood that the second and third items of the first rule are for the same slice, same frequency point and different cells.

In an embodiment, for the same slice, the same frequency point and the same cell, the terminal device can determine the first frequency point priority of the frequency point according to the first or the fourth item of the first rule.

In an embodiment, for the same slice, the same frequency point and different cells, the terminal device can determine the first frequency point priority according to the first rule in a case that the frequency point priorities of the frequency point based on the different cells are different. Of course, in a case that the frequency point priority of the frequency point is the same based on different cells, the terminal device can also determine the first frequency point priority according to the first rule.

It should be understood that, since the terminal device performs cell reselection based on the frequency point priority of the frequency point, the frequency point priority of the frequency point is also referred to as the reselection priority of the cell in the present disclosure, which will not be elaborated in detail below.

It should be understood that in a case that the frequency point priorities of the frequency point based on the different cells are different, determining the first frequency point priority according to the first rule is also described as follows. For the same slice same frequency point and different cells, in a case that the reselection priorities of different cells are different, the first frequency point priority or the reselection priority is determined according to the first rule. Alternatively, for the same slice, in a case that reselection priorities of different cells, which belong to the same frequency point, in the candidate cells are different, the first frequency point priority or the reselection priority is determined according to the first rule.

The first item of the first rule is explained below.

In an embodiment, for the same slice, the same frequency point and different cells, the network indication is used to indicate that one of the frequency point priorities of the frequency point based on the different cells is taken as the first frequency point priority, or that the conventional frequency point priority of the frequency point is taken as the first frequency point priority.

It should be understood that the conventional frequency point priority means that the frequency point priority is only related to the frequency point and does not related to the cells and slices.

In a first example, for the same slice 1, the same frequency point F1 and a cell 1 and a cell 2, a frequency point priority of the frequency point F1 based on the cell 1 is 1, a frequency point priority of the frequency point F1 based on the cell 2 is 3, and the frequency point priority of 3 is higher than the frequency point priority of 1. The network indicates that the frequency point priority of the frequency point F1 based on the cell 2 is taken as the first frequency point priority. That is, the finally determined first frequency point priority is 3.

In a second example, for the same slice 1, the same frequency point F1 and a cell 1 and a cell 2, a frequency point priority of the frequency point F1 based on the cell 1 is 1, a frequency point priority of the frequency point F1 based on the cell 2 is 3, and the frequency point priority of 3 is higher than the frequency point priority of 1. The network indicates that a conventional frequency point priority of the frequency point F1 is taken as the first frequency point priority, and assuming that the conventional frequency point priority of the frequency point F1 is 2, the finally determined first frequency point priority is 2.

In an embodiment, for the same frequency point, the same slice and different cells, one of the frequency point priorities of the frequency point based on the different cells is taken as the first frequency point priority according to a predefined manner, or the conventional frequency point priority of the frequency point is taken as the first frequency point priority according to a predefined manner.

In a third example, for the same slice 1, the same frequency point F1 and a cell 1 and a cell 2, a frequency point priority of the frequency point F1 based on the cell 1 is 1, a frequency point priority of the frequency point F1 based on the cell 2 is 3, and the frequency point priority of 3 is higher than the frequency point priority of 1. According to a predefined manner, the frequency point priority of the frequency point F1 based on the cell 2 is taken as the first frequency point priority. That is, the finally determined first frequency point priority is 3.

In a fourth example, for the same slice 1, the same frequency point F1 and a cell 1 and a cell 2, a frequency point priority of the frequency point F1 based on the cell 1 is 1, a frequency point priority of the frequency point F1 based on the cell 2 is 3, and the frequency point priority of 3 is higher than the frequency point priority of 1. The conventional frequency point priority of the frequency point F1 is taken as the first frequency point priority according to a predefined manner. Assuming that the conventional frequency point priority of the frequency point F1 is 2, the finally determined first frequency point priority is 2.

The second item of the first rule is explained in detail below.

In an embodiment, determining the first frequency point priority according to the frequency point priorities of the frequency point based on the different cells includes, but not limited to, any one of the followings.

(1) A highest priority in the frequency point priorities of the frequency point based on the different cells is determined as the first frequency point priority.

(2) A lowest priority in the frequency point priorities of the frequency point based on the different cells is determined as the first frequency point priority.

(3) An average priority of the frequency point priorities of the frequency point based on the different cells is determined as the first frequency point priority.

(4) A randomly selected priority from the frequency point priorities of the frequency point based on the different cells is determined as the first frequency point priority.

(5) The first frequency point priority is determined according to indexes of the different cells and the frequency point priorities of the frequency point based on the different cells.

(6) The first frequency point priority is determined according to whether each of the different cells is a current serving cell and the frequency point priorities of the frequency point based on the different cells.

(7) The first frequency point priority is determined according to channel qualities of the different cells and the frequency point priorities of the frequency point based on the different cells.

(8) The first frequency point priority is determined according to beam numbers of the different cells and the frequency point priorities of the frequency point based on the different cells.

(9) The first frequency point priority is determined according to the channel qualities of the different cells, the beam numbers of the different cells and the frequency point priorities of the frequency point based on the different cells.

(10) The first frequency point priority is determined according to whether each of the different cells is a cell other than the current serving cell and the frequency point priorities of the frequency point based on the different cells.

The item (1) is exemplarily explained below.

In a fifth example, for the same slice 1, the same frequency point F1 and a cell 1 and a cell 2, a frequency point priority of the frequency point F1 based on the cell 1 is 1 and a frequency point priority of the frequency point F1 based on the cell 2 is 3, and the frequency point priority of 3 is higher than the frequency point priority of 1. The terminal device can determine the frequency point priority of 3 as the first frequency point priority.

The item (2) is exemplarily explained below.

In a sixth example, for the same slice 1, the same frequency point F1 and a cell 1 and a cell 2, a frequency point priority of the frequency point F1 based on the cell 1 is 1, a frequency point priority of the frequency point F1 based on the cell 2 is 3, and the frequency point priority of 3 is higher than the frequency point priority of 1, and the terminal device can determine the frequency point priority of 1 as the first frequency point priority.

The item (3) is exemplarily explained below.

In a seventh example, for the same slice 1, the same frequency point F1 and a cell 1 and a cell 2, a frequency point priority of the frequency point F1 based on the cell 1 is 1 and a frequency point priority of the frequency point F1 based on the cell 2 is 3, and the frequency point priority of 3 is higher than the frequency point priority of 1. The terminal device can determine an average value 2 of the frequency point priority of 1 and the frequency point priority of 3 as the first frequency point priority.

The item (4) is exemplarily explained below.

In an eighth example, for the same slice 1, the same frequency point F1 and a cell 1 and a cell 2, a frequency point priority of the frequency point F1 based on the cell 1 is 1, and a frequency point priority of the frequency point F1 based on the cell 2 is 3, and the frequency point priority of 3 is higher than the frequency point priority of 1. The terminal device can randomly select a frequency point priority from the frequency point priority of 1 and the frequency point priority of 3, such as randomly select the frequency point priority of 3, and determine the selected frequency point priority as the first frequency point priority.

The item (5) is exemplarily explained below:

In the eighth example, for the same slice 1, the same frequency point F1 and a cell 1 and a cell 2, a frequency point priority of the frequency point F1 based on the cell 1 is 1, a frequency point priority of the frequency point F1 based on the cell 2 is 3, the frequency point priority of 3 is higher than the frequency point priority of 1, an index of the cell 1 is 1, and an index of the cell 2 is 2. The terminal device can select the frequency point priority of a cell with the smallest index in the two cells as the first frequency point priority. That is, the frequency point priority of the cell 1 is selected as the first frequency point priority. That is, the terminal device finally determines the frequency point priority of 1 as the first frequency point priority.

In a ninth example, for the same slice 1, the same frequency point F1 and a cell 1 and a cell 2, a frequency point priority of the frequency point F1 based on the cell 1 is 1, a frequency point priority of the frequency point F1 based on the cell 2 is 3, the frequency point priority of 3 is higher than the frequency point priority of 1, an index of the cell 1 is 1, and an index of the cell 2 is 2. The terminal device can select a cell with the largest index in the two cells as the first frequency point priority. That is, the frequency point priority of the cell 2 is selected as the first frequency point priority. That is, the terminal device finally determines the frequency point priority of 3 as the first frequency point priority.

The item (6) is exemplarily explained below.

In a tenth example, for the same slice 1, the same frequency point F1 and a cell 1 and a cell 2, a frequency point priority of the frequency point F1 based on the cell 1 is 1 and a frequency point priority of the frequency point F1 based on the cell 2 is 3, and the frequency point priority of 3 is higher than the frequency point priority of 1. Assuming that a current serving cell is the cell 1, the terminal device can take the frequency point priority of the cell 1 as the first frequency point priority. That is, the terminal device finally determines the frequency point priority of 1 as the first frequency point priority.

In an eleventh example, for the same slice 1, the same frequency point F1 and a cell 1 and a cell 2, a frequency point priority of the frequency point F1 based on the cell 1 is 1, a frequency point priority of the frequency point F1 based on the cell 2 is 3, and the frequency point priority of 3 is higher than the frequency point priority of 1. Assuming that a current serving cell is the cell 2, the terminal device can take the frequency point priority of the cell 2 as the first frequency point priority. That is, the terminal device finally determines the frequency point priority of 3 as the first frequency point priority.

The item (7) is exemplarily explained below.

In a first implementation, the terminal device can select at least one second cell meeting a channel quality condition according to the channel qualities of the different cells. The highest priority in at least one frequency point priority of the frequency point based on the at least one second cell is determined as the first frequency point priority. Alternatively, the lowest priority in at least one frequency point priority of the frequency point based on the at least one second cell is determined as the first frequency point priority. Alternatively, an average priority of at least one frequency point priority of the frequency point based on the at least one second cell is determined as the first frequency point priority. Alternatively, a randomly selected priority from at least one frequency point priority of the frequency point based on the at least one second cell is determined as the first frequency point priority.

In a second implementation, the terminal device selects a cell with the highest channel quality in different cells, and determines a frequency point priority of the frequency point based on the cell with the highest channel quality as the first frequency point priority.

In an embodiment, the channel quality can be measured by at least one of: Reference Signal Received Power (RSRP), Reference Signal Received Quality (RSRQ), Received Signal Strength Indication (RSSI), Signal to Interference plus Noise Ratio (SINR) or SIGNAL NOISE RATIO (SNR).

The first implementation is exemplarily explained below.

In a twelfth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a channel quality of the cell 1 is 20 db, a channel quality of the cell 2 is 10 db, and a channel quality of the cell 3 is 18 db. A cell with the highest channel quality is the cell 1. Assuming that the channel quality condition is that falling within a channel quality interval [the highest channel quality−5, the highest channel quality], i.e., [15 db, 20 db], the cell 1 and the cell 3 meet the channel quality condition. The terminal device can take the highest priority of the frequency point priority of the cell 1 and the frequency point priority of the cell 3 as the first frequency point priority. That is, the terminal device can take the frequency point priority of 5 as the first frequency point priority.

In a thirteenth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a channel quality of the cell 1 is 20 db, a channel quality of the cell 2 is 10 db, and a channel quality of the cell 3 is 18 db. A cell with the highest channel quality is the cell 1. Assuming that the channel quality condition is that falling within a channel quality interval [the highest channel quality−5, the highest channel quality], i.e., [15 db, 20 db], the cell 1 and the cell 3 meet the channel quality condition. The terminal device can take the lowest priority of the frequency point priority of the cell 1 and the frequency point priority of the cell 3 as the first frequency point priority. That is, the terminal device can take the frequency point priority of 1 as the first frequency point priority.

In a fourteenth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a channel quality of the cell 1 is 20 db, a channel quality of the cell 2 is 10 db, and a channel quality of the cell 3 is 18 db. A cell with the highest channel quality is the cell 1. A cell with the highest channel quality is the cell 1. Assuming that the channel quality condition is that falling within a channel quality interval [the highest channel quality−5, the highest channel quality], i.e., [15 db, 20 db], the cell 1 and the cell 3 meet the channel quality condition. The terminal device can take an average value of the frequency point priority of the cell 1 and the frequency point priority of the cell 3 as the first frequency point priority. That is, the terminal device takes a frequency point priority of (1+5)/2=3 as the first frequency point priority.

In a fifteenth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a channel quality of the cell 1 is 20 db, a channel quality of the cell 2 is 10 db, and a channel quality of the cell 3 is 18 db. A cell with the highest channel quality is the cell 1. Assuming that the channel quality condition is that falling within a channel quality interval [the highest channel quality−5, the highest channel quality], i.e., [15 db, 20 db], the cell 1 and the cell 3 meet the channel quality condition. The terminal device randomly selects one of the frequency point priority of the cell 1 and the frequency point priority of the cell 3 as the first frequency point priority.

The second implementation is first exemplarily explained below.

In a sixteenth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a channel quality of the cell 1 is 20 db, a channel quality of the cell 2 is 10 db, and a channel quality of the cell 3 is 18 db. A cell with the highest channel quality is the cell 1. The terminal device can take the frequency point priority of the cell 1, that is, the frequency point priority of 1, as the first frequency point priority.

The item (8) is exemplarily explained below.

In a first implementation, the terminal device selects at least one third cell meeting a beam number condition according to the beam numbers of the different cells. The highest priority in at least one frequency point priority of the frequency point based on the at least one third cell is determined as the first frequency point priority. Alternatively, the lowest priority in at least one frequency point priority of the frequency point based on the at least one third cell is determined as the first frequency point priority. Alternatively, an average priority of at least one frequency point priority of the frequency point based on the at least one third cell is determined as the first frequency point priority. In an embodiment, a randomly selected priority from at least one frequency point priority of the frequency point based on the at least one third cell is determined as the first frequency point priority.

In a second implementation, the terminal device selects a cell with the largest number of beams in different cells, and determines a frequency point priority of the frequency point based on the cell with the largest number of beams as the first frequency point priority.

The first implementation is first exemplarily explained below.

In a seventeenth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a number of beams of the cell 1 is 8, a number of beams of the cell 2 is 12, and a number of beams of cell 3 is 16. A cell with the largest number of beams is the cell 3. Assuming that the beam number condition is that falling within a beam number interval [maximum number of beams−5, maximum number of beams], i.e., [11, 16], the cell 2 and the cell 3 meet the channel quality condition. The terminal device can take the highest priority of the frequency point priority of the cell 2 and the frequency point priority of the cell 3, i.e., the frequency point priority of 5, as the first frequency point priority.

In an eighteenth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a number of beams of the cell 1 is 8, a number of beams of the cell 2 is 12, and a number of beams of cell 3 is 16. A cell with the largest number of beams is the cell 3. Assuming that the beam number condition is that falling within a beam number interval [maximum number of beams−5, maximum number of beams], i.e., [11, 16], the cell 2 and the cell 3 meet the channel quality condition. The terminal device can take the lowest priority of the frequency point priority of the cell 2 and the frequency point priority of the cell 3, i.e., the frequency point priority of 3, as the first frequency point priority.

In a nineteenth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a number of beams of the cell 1 is 8, a number of beams of the cell 2 is 12, and a number of beams of cell 3 is 16. A cell with the largest number of beams is the cell 3. Assuming that the beam number condition is that falling within a beam number interval [maximum number of beams−5, maximum number of beams], i.e., [11, 16], the cell 2 and the cell 3 meet the channel quality condition. The terminal device can take an average value of the frequency point priority of the cell 2 and the frequency point priority of the cell 3, i.e., the frequency point priority (3+5)/2=4, as the first frequency point priority.

In a twentieth example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a number of beams of the cell 1 is 8, a number of beams of the cell 2 is 12, and a number of beams of cell 3 is 16. A cell with the largest number of beams is the cell 3. Assuming that the beam number condition is falling within a beam number interval [maximum number of beams−5, maximum number of beams], i.e., [11, 16], the cell 2 and the cell 3 meet the channel quality condition. The terminal device can randomly select one of the frequency point priority of the cell 2 and the frequency point priority of the cell 3 as the first frequency point priority.

The second implementation is first exemplarily explained below.

In a twenty-first example, for the same slice 1, the same frequency point F1 and a cell 1, a cell 2 and a cell 3, a frequency point priority of the frequency point F1 based on the cell 1 is 1, a frequency point priority of the frequency point F1 based on the cell 2 is 3, a frequency point priority of the frequency point F1 based on the cell 3 is 5, the frequency point priority of 5 is higher than the frequency point priority of 3, the frequency point priority of 3 is higher than the frequency point priority of 1, a number of beams of the cell 1 is 8, a number of beams of the cell 2 is 12, and a number of beams of cell 3 is 16. A cell with the largest number of beams is the cell 3. The terminal device can take the frequency point priority of the cell 3, that is, the frequency point priority of 5, as the first frequency point priority.

The item (9) is exemplarily explained below.

In a first implementation, the terminal device selects at least one fourth cell meeting the channel quality condition according to the channel qualities of the different cells. At least one fifth cell meeting the beam number condition is selected according to at least one beam number of the at least one fourth cell. The highest priority in at least one frequency point priority of the frequency point based on the at least one fifth cell is determined as the first frequency point priority. Alternatively, the lowest priority in at least one frequency point priority of the frequency point based on the at least one fifth cell is determined as the first frequency point priority. Alternatively, an average priority of at least one frequency point priority of the frequency point based on the at least one fifth cell is determined as the first frequency point priority. Alternatively, a randomly selected priority from at least one frequency point priority of the frequency point based on the at least one fifth cell is determined as the first frequency point priority.

In a second implementation, the terminal device selects at least one fourth cell meeting the channel quality condition according to the channel qualities of the different cells. A cell with a largest number of beams in the at least one fourth cell is selected, and a frequency point priority of the frequency point based on the cell with the largest number of beams is determined as the first frequency point priority.

In a third implementation, the terminal device selects at least one sixth cell meeting the beam number condition according to beam numbers of different cells. At least one seventh cell meeting a channel quality condition is selected according to at least one channel quality of the at least one sixth cell. A highest priority in at least one frequency point priority of the frequency point based on the at least one seventh cell is determined as the first frequency point priority. Alternatively, a lowest priority in at least one frequency point priority of the frequency point based on the at least one seventh cell is determined as the first frequency point priority. Alternatively, an average priority of at least one frequency point priority of the frequency point based on the at least one seventh cell is determined as the first frequency point priority. Alternatively, a randomly selected priority from at least one frequency point priority of the frequency point based on the at least one seventh cell is determined as the first frequency point priority.

In a fourth implementation, the terminal device selects at least one sixth cell meeting the beam number condition according to beam numbers of different cells. A cell with a highest channel quality in the at least one sixth cell is selected, and a frequency point priority of the frequency point based on the cell with the highest channel quality is determined as the first frequency point priority.

The first implementation is first exemplarily explained below.

In a twenty-second example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. A cell with the highest channel quality is the cell 1. Assuming that the channel quality condition is that falling within a channel quality interval [the highest channel quality−5, the highest channel quality], i.e., [15 db, 20 db], the cell 1, the cell 3 and the cell 4 meet the channel quality condition. Further, assuming that the beam number condition is that falling within a beam number interval [maximum number of beams−5, maximum number of beams], i.e., [11, 16], the cell 3 and the cell 4 among the cell 1, the cell 3 and the cell 4 meet the beam number condition. The terminal device can take the highest priority of the frequency point priority of the cell 3 and the frequency point priority of the cell 4, i.e., the frequency point priority of 7, as the first frequency point priority.

In a twenty-third example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. A cell with the highest channel quality is the cell 1. Assuming that the channel quality condition is that falling within a channel quality interval [the highest channel quality−5, the highest channel quality], i.e., [15 db, 20 db], the cell 1, the cell 3 and the cell 4 meet the channel quality condition. Further, assuming that the beam number condition is that falling within a beam number interval [maximum number of beams−5, maximum number of beams], i.e., [11, 16], the cell 3 and the cell 4 among the cell 1, the cell 3 and the cell 4 meet the beam number condition. The terminal device can take the lowest priority between the frequency point priority of the cell 3 and the frequency point priority of the cell 4, i.e., the frequency point priority of 5, as the first frequency point priority.

In a twenty-fourth example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. A cell with the highest channel quality is the cell 1. Assuming that the channel quality condition is that falling within a channel quality interval [the highest channel quality−5, the highest channel quality], i.e., [15 db, 20 db], the cell 1, the cell 3 and the cell 4 meet the channel quality condition. Further, assuming that the beam number condition is that falling within a beam number interval [maximum number of beams−5, maximum number of beams], i.e., [11, 16], the cell 3 and the cell 4 among the cell 1, the cell 3 and the cell 4 meet the beam number condition. The terminal device can take an average value of the frequency point priority of the cell 3 and the frequency point priority of the cell 4, i.e., (5+7)/2=6, as the first frequency point priority.

In a twenty-fifth example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. A cell with the highest channel quality is the cell 1. Assuming that the channel quality condition is that falling within a channel quality interval [the highest channel quality−5, the highest channel quality], i.e., [15 db, 20 db], the cell 1, the cell 3 and the cell 4 meet the channel quality condition. Further, assuming that the beam number condition is that falling within a beam number interval [maximum number of beams−5, maximum number of beams], i.e., [11, 16], the cell 3 and the cell 4 among the cell 1, the cell 3 and the cell 4 meet the beam number condition. The terminal device can randomly select one of the frequency point priority of the cell 3 and the frequency point priority of the cell 4 as the first frequency point priority.

The second implementation is first exemplarily explained below.

In a twenty-sixth example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. A cell with the highest channel quality is the cell 1. Assuming that the channel quality condition is that falling within a channel quality interval [the highest channel quality−5, the highest channel quality], i.e., [15 db, 20 db], the cell 1, the cell 3 and the cell 4 meet the channel quality condition. Further, the terminal device can select the frequency point priority of a cell with the largest number of beams among the cell 1, the cell 3 and the cell 4, as the first frequency point priority. The frequency point priority of cell 3 is the highest priority. That is, the terminal device can select the frequency point priority of 5 as the first frequency point priority.

The third implementation is first exemplarily explained below.

In a twenty-seventh example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. Assuming that the beam number condition is that falling within a beam number interval [maximum number of beams−5, maximum number of beams], i.e., [11, 16], the cell 2, the cell 3 and the cell 4 meet the beam number condition. Further, a cell with the highest channel quality is the cell 1, assuming that the channel quality condition is that falling within a channel quality interval [the highest channel quality−5, the highest channel quality], i.e., [15 db, 20 db], the cell 3 and the cell 4 among the cell 2, the cell 3 and the cell 4 meet the channel quality condition. The terminal device can take the highest priority between the frequency point priority of the cell 3 and the frequency point priority of the cell 4, i.e., the frequency point priority of 7, as the first frequency point priority.

In a twenty-eighth example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. Assuming that the beam number condition is that falling within a beam number interval [maximum number of beams−5, maximum number of beams], i.e., [11, 16], the cell 2, the cell 3 and the cell 4 meet the beam number condition. Further, a cell with the highest channel quality is the cell 1, assuming that the channel quality condition is that falling within a channel quality interval [the highest channel quality−5, the highest channel quality], i.e., [15 db, 20 db], the cell 3 and the cell 4 among the cell 2, the cell 3 and the cell 4 meet the channel quality condition. The terminal device can take the lowest priority of the frequency point priority of the cell 3 and the frequency point priority of the cell 4, i.e., the frequency point priority of 5, as the first frequency point priority.

In a twenty-ninth example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. Assuming that the beam number condition is that falling within a beam number interval [maximum number of beams−5, maximum number of beams], i.e., [11, 16], the cell 2, the cell 3 and the cell 4 meet the beam number condition. Further, a cell with the highest channel quality is the cell 1, assuming that the channel quality condition is that falling within a channel quality interval [the highest channel quality−5, the highest channel quality], i.e., [15 db, 20 db], the cell 3 and the cell 4 among the cell 2, the cell 3 and the cell 4 meet the channel quality condition. The terminal device can take an average value of the frequency point priority of the cell 3 and the frequency point priority of the cell 4, i.e., (5+7)/2=6, as the first frequency point priority.

In a twenty-ninth example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. Assuming that the beam number condition is that falling within a beam number interval [maximum number of beams−5, maximum number of beams], i.e., [11, 16], the cell 2, the cell 3 and the cell 4 meet the beam number condition. Further, a cell with the highest channel quality is the cell 1, assuming that the channel quality condition is that falling within a channel quality interval [the highest channel quality−5, the highest channel quality], i.e., [15 db, 20 db], the cell 3 and the cell 4 among the cell 2, the cell 3 and the cell 4 meet the channel quality condition. The terminal device randomly selects one of the frequency point priority of the cell 3 and the frequency point priority of the cell 4 as the first frequency point priority.

The fourth implementation is first exemplarily explained below.

In a thirtieth example, for the same slice 1, the same frequency point F1 and a cell 1, a cell 2, a cell 3 and a cell 4, a frequency point priority of the frequency point F1 based on the cell 1 is 1, a frequency point priority of the frequency point F1 based on the cell 2 is 3, a frequency point priority of the frequency point F1 based on the cell 3 is 5, a frequency point priority of 7 based on the cell 4, the frequency point priority of 7 is higher than the frequency point priority of 5, the frequency point priority of 5 is higher than the frequency point priority of 3, and the frequency point priority of 3 is higher than the frequency point priority of 1. A channel quality of the cell 1 is 20 db and a number of beams of the cell 1 is 8, a channel quality of the cell 2 is 10 db and a number of beams of the cell 2 is 12, a channel quality of the cell 3 is 18 db and the number of beams of the cell 3 is 16, and a channel quality of the cell 4 is 16 db and the number of beams of the cell 4 is 14. Assuming that the beam number condition is that falling within a beam number interval [maximum number of beams−5, maximum number of beams], i.e., [11, 16], the cell 2, the cell 3 and the cell 4 meet the beam number condition. Further, the terminal device selects a frequency point priority of a cell with the highest channel quality among the cell 2, the cell 3 and the cell 4 as the first frequency point priority. That is, the terminal device selects the frequency point priority of the cell 3 as the first frequency point priority.

The item (10) is exemplarily explained below.

In an embodiment, in a case that at least one cell in the different cells is not the current serving cell, the terminal device selects an eighth cell in the at least one cell, and determines a frequency point priority of the frequency point based on the eighth cell as the first frequency point priority.

For example, the eighth cell is a cell with the smallest cell index, or a cell with the highest frequency point priority, or a cell with the largest index, or a cell with the lowest frequency point priority, or any cell.

The third item of the first rule is first exemplarily explained below.

In a thirty-first example, for the same slice 1, the same frequency point F1 and a cell 1 and a cell 2, a frequency point priority of the frequency point F1 based on the cell 1 is 1, a frequency point priority of the frequency point F1 based on the cell 2 is 3, and the frequency point priority of 3 is higher than the frequency point priority of 1. The terminal device determines that a virtual frequency point of the cell 1 is A, a virtual frequency point priority corresponding to the virtual frequency point of the cell 1 is 3, a virtual frequency point of the cell 2 is B, and a virtual frequency point priority corresponding to the virtual frequency point of the cell 2 is 1. Based on this, according to the virtual priorities of the cell 1 and cell 2, the terminal device selects the highest virtual frequency point priority of 3 as the first frequency point priority, or selects the lowest virtual frequency point priority of 1 as the first frequency point priority, or randomly selects one of the virtual frequency point priority of 1 and the virtual frequency point priority of 3 as the first frequency point priority, or takes an average value of the virtual frequency point priority of 1 and the virtual frequency point priority of 3 as the first frequency point priority.

In an embodiment, in the first and fourth items of the first rule, assuming that the above-mentioned frequency point is referred to as a first frequency point, as described in the first and fourth items, the terminal device may determine a conventional frequency point priority of the first frequency point as the first frequency point priority. For a frequency point other than the first frequency point, the terminal device may also determine the conventional frequency point priority as a frequency point priority of that frequency point. Alternatively, assuming that the manners other than the manner of determining the conventional frequency point priority as the first frequency point priority is referred to as a slice-based frequency point priority determination manner in the first rule, for the frequency point other than the first frequency point, the terminal device may also determine the frequency point priority of that frequency point by adopting the slice-based frequency point priority determination manner.

It should be understood that the present embodiment is also applicable to frequency points or cells not supporting slices. That is, for a frequency point not supporting slices, the terminal device can also determine a first frequency point priority of the frequency point according to the first rule, and it can also be described that for a cell not supporting slices, the terminal device can determine a reselection priority of the cell according to the first rule.

To sum up, in the present disclosure, for the same slice and the same frequency point, the terminal device can determine the first frequency point priority of the frequency point according to the first rule. Especially for the same slice, the same frequency point and different cells, in a case that frequency point priorities of the frequency point based on the different cells are different, the frequency point priorities of the frequency point can be unified through the technical solution of the present disclosure.

FIG. 6 is a flowchart of another wireless communication method provided by an embodiment of the present disclosure, and the method may be performed by a terminal device. As shown in FIG. 6, the method includes the following flows.

At S610: For different slices, a same first frequency point and different cells, the terminal device performs cell reselection according to a second rule. The second rule includes any one of the followings.

1. When performing the cell reselection, a non-specific cell is excluded. The non-specific cell is a cell not supporting a target slice.
2. When performing the cell reselection, a reselection priority of a non-specific cell is set to be different from a reselection priority of a specific cell. The specific cell is a cell supporting a target slice.
3. The cell reselection is performed according to a conventional frequency point priority of the first frequency point.

In an embodiment, the terminal device can obtain slice related information from the network device, and the slice related information includes at least one of: slices supported by the network device, or frequency point priorities of the frequency point when the slice is considered. For example, the frequency point priorities of the frequency point are the frequency point priorities for the same slice, the same frequency point and different cells. For another example, the frequency point priorities of the frequency point are the frequency point priorities for the same frequency point and the same slice.

In an embodiment, the number of slices is one or more. If there are multiple slices, the multiple slices can be referred to as a slice group.

In an embodiment, the slice is of any of following levels, but is not limited thereto: cell, frequency point, tracking area or registration area.

In an embodiment, the slice can be identified by any one of the following, but is not limited to thereto: an index of the slice, an identification, a Slice/Service Type (SST), a cell group identification, or parameters corresponding to the slice.

It should be understood that for different slices, the same first frequency point and different cells, the terminal device performs cell reselection according to the second rule, which is also described as follows. In a case that there are different cells belonging to the same frequency point and supporting different slices in candidate cells, the terminal device performs cell reselection according to the second rule.

The first item of the second rule is explained below.

In an embodiment, the target slice is specified by the network device or determined by the terminal device itself, which is not limited in the present disclosure.

In an embodiment, the target slice is a slice required by the terminal device.

In an embodiment, the operation of excluding, by the terminal device, a non-specific cell may be performed before performing cell reselection based on the frequency point priority of the first frequency point or after performing cell reselection based on the frequency point priority of the first frequency point.

In an embodiment, the frequency point priority of the first frequency point here may be the frequency point priorities of the first frequency point based on different cells, or the conventional frequency point priority of the first frequency point, which is not limited in the present disclosure.

In a thirty-second example, for the same frequency point F1, a cell 1 and a cell 2, the cell 1 supports a slice 1, the cell 2 supports a slice 2. The slice 1 is a target slice, then according to the above definitions of the non-specific cell and the specific cell, the cell 1 is the specific cell and the cell 2 is the non-specific cell. Assuming that after performing cell reselection of inter-frequency, in a case that a cell meeting a channel quality condition is the cell 1, the terminal device reselects the cell 1, and in a case that the cell meeting a channel quality condition is the cell 2, the terminal device cannot reselects the cell 2.

The second item of the second rule is explained below.

It should be understood that a specific cell may be a candidate cell, a suitable cell, or an acceptable cell, which is not limited by the present disclosure.

In an embodiment, when performing the cell reselection, setting the reselection priority of the non-specific cell to be different from the reselection priority of the specific cell, includes, but not limited to, any one of the followings.

(1) The reselection priority of the non-specific cell is set to be lower than conventional frequency point priorities of all frequency points or lower than a frequency point priority of a current serving cell.

(2) The reselection priority of the specific cell is set to be higher than the conventional frequency point priority of the first frequency point or a frequency point priority of the first frequency point based on a first slice, herein the first slice is a slice corresponding to the specific cell.

(3) The reselection priority of the non-specific cell is set to be lower than the conventional frequency point priorities of all frequency points or lower than the frequency point priority of the current serving cell, and the reselection priority of the specific cell is set to be the conventional frequency point priority of the first frequency point or the frequency point priority of the first frequency point based on the first slice.

(4) The reselection priority of the non-specific cell is set to be lower than the conventional frequency point priorities of all frequency points or lower than the frequency point priority of the current serving cell, and the reselection priority of the specific cell is set to be higher than the conventional frequency point priority of the first frequency point or the frequency point priority of the first frequency point based on the first slice.

(5) The reselection priority of the non-specific cell is set to be lower than a minimum value of the conventional frequency point priority of the first frequency point and a reselection priority of the current serving cell, and the reselection priority of the specific cell is set to be the conventional priority of the first frequency point or the frequency point priority of the first frequency point based on the first slice.

(6) The reselection priority of the non-specific cell is set to be lower than one of the conventional frequency point priority of the first frequency point and the reselection priority of the current serving cell, and the reselection priority of the specific cell is set to be the conventional frequency point priority of the first frequency point or the frequency point priority of the first frequency point based on the first slice.

(7) The reselection priority of the non-specific cell is set to be lower than a minimum value of the conventional frequency point priority of the first frequency point and the frequency point priority of the first frequency point based on the first slice, and the reselection priority of the specific cell is set to be higher than or equal to a maximum value of the conventional frequency point priority of the first frequency point and the frequency point priority of the first frequency point based on the first slice.

(8) The reselection priority of the non-specific cell is set to be the minimum value of the conventional frequency point priority of the first frequency point and the frequency point priority of the first frequency point based on the first slice, and the reselection priority of the specific cell is set to be the maximum value of the conventional frequency point priority of the first frequency point and the frequency point priority of the first frequency point based on the first slice.

(9) The reselection priority of the non-specific cell is set to be a minimum value of the conventional frequency point priority of the first frequency point and a frequency point priority of the first frequency point based on a second slice, and the reselection priority of the specific cell is set to be the maximum value of the conventional frequency point priority of the first frequency point and the frequency point priority of the first frequency point based on the first slice, herein the second slice is a slice corresponding to the non-specific cell.

It should be understood that the present disclosure does not limit how to determine the frequency point priority of the first frequency point based on the first slice. For example, the terminal device may take the frequency point priority of the first frequency point based on the specific cell corresponding to the first slice as the frequency point priority of the first frequency point based on the first slice. Similarly, the present disclosure does not limit how to determine the frequency point priority of the first frequency point based on the second slice. For example, the terminal device can take the frequency point priority of the first frequency point based on the non-specific cell corresponding to the second slice as the frequency point priority of the first frequency point based on the second slice.

In a thirty-third example, for the same frequency point F1 and a cell 1 and a cell 2, the cell 1 supports a slice 1, the cell 2 supports a slice 2, and the slice 1 is a target slice. According to definitions of the non-specific cell and the specific cell, the cell 1 is the specific cell and the cell 2 is the non-specific cell. The terminal device determines that a virtual frequency point of the cell 2 is A. A frequency point priority of the virtual frequency point A is lower than conventional priorities of all frequency points or lower than a frequency point priority of a current serving cell. The terminal device determines that a reselection priority of the cell 1 is a conventional priority of the frequency point F1 or a frequency point priority of the frequency point F1 based on the slice 1.

In a thirty-fourth example, for the same frequency point F1 and a cell 1 and a cell 2, the cell 1 supports a slice 1, the cell 2 supports a slice 2, and the slice 1 is a target slice. According to definitions of the non-specific cell and the specific cell, the cell 1 is the specific cell and the cell 2 is the non-specific cell. The terminal device determines that the virtual frequency point of the cell 1 is A and the virtual frequency point of the cell 2 is B. A frequency point priority of the virtual frequency point A is a frequency point priority of the frequency point F1 based on the slice 1. A frequency point priority of the virtual frequency point B is a conventional frequency point priority of the frequency point F1.

In a thirty-fifth example, for the same frequency point F1 and a cell 1 and a cell 2, the cell 1 supports a slice 1, the cell 2 supports a slice 2, and the slice 1 is a target slice. According to definitions of the non-specific cell and the specific cell, the cell 1 is the specific cell and the cell 2 is the non-specific cell. The terminal device determines that the virtual frequency point of the cell 1 is A and the virtual frequency point of the cell 2 is B. A frequency point priority of the virtual frequency point A is the highest priority of a frequency point priority of the frequency point F1 based on the slice 1 and a conventional frequency point priority of the frequency point F1. A frequency point priority of the virtual frequency point B is the lowest priority of a frequency point priority of the frequency point F1 based on the slice 2 and the conventional frequency point priority of the frequency point F1.

The third item of the second rule is explained below.

In an embodiment, the terminal device can perform cell reselection according to the conventional frequency point priority of the first frequency point. For a frequency point other than the first frequency point, the terminal device may also perform cell reselection according to a conventional frequency point priority of that frequency point. Alternatively, assuming that the manner other than a manner of performing the cell reselection according to the conventional frequency point priority is referred to as a slice-based cell reselection manner in the second rule, the terminal device may also perform cell reselection for the frequency point other than the first frequency point by adopting the slice-based cell reselection manner.

In an embodiment, the frequency point other than the first frequency point may support a same slice as the first frequency point.

It should be understood that the present embodiment is also applicable to frequency points or cells not supporting slices. That is, for frequency points not supporting slices, the terminal device can perform cell reselection according to the second rule.

To sum up, in the present disclosure, for different slices, the same first frequency point and different cells, the terminal device performs cell reselection according to the second rule.

In an embodiment, in a case that a System Information Block (SIB) message received by the terminal device carries a conventional frequency point priority of a frequency point, and a dedicated RRC message, such as an RRC release message, carries information of a slice (such as an index or identification of the slice) and a frequency point priority of the frequency point based on that slice, the terminal device performs cell reselection according to the dedicated RRC message, such as the frequency point priority and/or the information of the slice carried in the RRC release message.

One possible way to write it is as follows. In the case that the existing dedicated priority configuration is provided in an SIB message while the slice info and a per-slice frequency point priority are provided in an RRC Release message, UE follows the slice info and the per-slice frequency point priority from the RRC Release message.

In an embodiment, in a case that a SIB message received by the terminal device carries a conventional frequency point priority of a frequency point, and an RRC release message carries information of a slice and a frequency point priority of the frequency point based on that slice, the terminal device performs cell reselection according to the frequency point priority and/or the information of the slice carried in the RRC release message before a timer expires, and performs cell reselection according to the conventional frequency point priority of the frequency point carried in the SIB message after the timer expires.

One possible way to write it is as follows. In the case that the existing dedicated priority configuration is provided in an SIB message while the slice info and a per-slice frequency point priority are provided in an RRC Release message, UE follows the slice info and per-slice frequency point priority from the RRC Release message while T320-like timer is running.

In an embodiment, in a case that an RRC release message does not carry a frequency point priority of a frequency point based on a slice, the terminal device determines that a frequency point priority of the frequency point supporting the slice is higher than a frequency point priority of a frequency point not supporting the slice, or the terminal device determines that a reselection priority of a cell supporting the slice is higher than a reselection priority of a cell not supporting the slice.

In an embodiment, in a case that an SIB message received by the terminal device carries a first frequency point priority of a frequency point based on a slice, and a dedicated RRC message, such as an RRC release message, carries a second frequency point priority of the frequency point based on the slice, and the first frequency point priority is different from the second frequency point priority, the terminal device performs cell reselection according to the dedicated RRC message, such as the second frequency point priority carried in the RRC release message.

One possible way to write it is as follows. In the case that both an SIB message and an RRC Release message provide slice-specific frequency point priorities whose values are different for one specific slice, UE follows a slice-specific frequency point priority from the RRC Release message.

In an embodiment, in a case that an SIB message received by the terminal device carries a first frequency point priority of a frequency point based on a slice, and an RRC release message carries a second frequency point priority of that frequency point based on that slice, and the first frequency point priority is different from the second frequency point priority, the terminal device performs cell reselection according to the second frequency point priority carried in the RRC release message before a timer expires, and performs cell reselection according to the first frequency point priority carried in the SIB message after the timer expires.

One possible way to write it is as follows. In the case that both an SIB message and an RRC Release message provide slice-specific frequency point priorities whose values are different for one specific slice, UE follows a slice-specific frequency point priority from the RRC Release while T320-like timer is running.

In an embodiment, in a case that an SIB message received by the terminal device carries information of a slice and a first frequency point priority of a frequency point based on that slice, and a dedicated RRC message, such as an RRC release message, only carries the information of the slice, the terminal device performs cell reselection according to the information of the slice carried in the RRC release message and the first frequency point priority carried in the SIB message.

One possible way to write it is as follows. In the case that slice info and a per-slice frequency point priority are provided in an SIB message while only the slice info is provided in an RRC Release message, UE follows the slice info from the RRC Release and the per-slice frequency point priority from the SIB message.

In an embodiment, in a case that an SIB message received by the terminal device carries information of a slice and a first frequency point priority of a frequency point based on the slice, and a dedicated RRC message, such as an RRC release message, only carries the information of the slice, the terminal device performs cell reselection according to the information of the slice carried in the RRC release message and the first frequency point priority carried in the SIB message before a timer expires.

One possible way to write it is as follows. In the case that slice info and a per-slice frequency point priority are provided in an SIB message while only the slice info is provided in an RRC Release message, UE follows the slice info from the RRC Release and the per-slice frequency point priority from the SIB message while T320-like timer is running.

In an embodiment, in a case that an SIB message received by the terminal device carries information of a slice and a first frequency point priority of a frequency point based on the slice, and a dedicated RRC message, such as an RRC release message, only carries the information of the slice, the terminal device determines that a frequency point priority of a frequency point supporting the slice is higher than a frequency point priority of a frequency point non supporting the slice, or the terminal device determines that a reselection priority of a cell supporting the slice is higher than a reselection priority of a cell not supporting the slice, or the terminal device performs cell reselection according to the first frequency point priority carried in the SIB message, or the terminal device performs cell reselection according to a conventional frequency point priority of the frequency point.

FIG. 7 shows a schematic block diagram of a terminal device 700 according to an embodiment of the present disclosure. As shown in FIG. 7, the terminal device 700 includes a processing unit 710 configured to: for a same slice and a same frequency point, determine a first frequency point priority of the frequency point according to a first rule. The first rule includes any one of the followings.

The first frequency point priority is determined according to a network indication or a predefined manner.

The first frequency point priority is determined according to frequency point priorities of the frequency point based on different cells.

The first frequency point priority is determined according to virtual frequency point priorities of the frequency point based on different cells.

A conventional frequency point priority of the frequency point is determined as the first frequency point priority.

In an embodiment, for the same slice, the same frequency point and different cells, the network indication is used to indicate that one of the frequency point priorities of the frequency point based on the different cells is taken as the first frequency point priority, or indicate that the conventional frequency point priority of the frequency point is taken as the first frequency point priority.

In an embodiment, determining the first frequency point priority according to the frequency point priorities of the frequency point based on the different cells includes any one of the followings.

A highest priority in the frequency point priorities of the frequency point based on the different cells is determined as the first frequency point priority.

A lowest priority in the frequency point priorities of the frequency point based on the different cells is determined as the first frequency point priority.

An average priority of the frequency point priorities of the frequency point based on the different cells is determined as the first frequency point priority.

A randomly selected priority from the frequency point priorities of the frequency point based on the different cells is determined as the first frequency point priority.

The first frequency point priority is determined according to indexes of the different cells and the frequency point priorities of the frequency point based on the different cells.

The first frequency point priority is determined according to whether each of the different cells is a current serving cell and the frequency point priorities of the frequency point based on the different cells.

The first frequency point priority is determined according to channel qualities of the different cells and the frequency point priorities of the frequency point based on the different cells.

The first frequency point priority is determined according to beam numbers of the different cells and the frequency point priorities of the frequency point based on the different cells.

The first frequency point priority is determined according to the channel qualities of the different cells, the beam numbers of the different cells and the frequency point priorities of the frequency point based on the different cells.

The first frequency point priority is determined according to whether each of the different cells is a cell other than the current serving cell and the frequency point priorities of the frequency point based on the different cells.

In an embodiment, determining the first frequency point priority according to indexes of the different cells and the frequency point priority of the frequency point based on the different cells includes following operations. A cell with a smallest index in the different cells is selected, and a frequency point priority of the frequency point based on the cell with the smallest index is determined as the first frequency point priority. Alternatively, a cell with a largest index in the different cells is selected, and a frequency point priority of the frequency point based on the cell with the largest index is determined as the first frequency point priority.

In an embodiment, determining the first frequency point priority according to whether each of the different cells is a current serving cell and the frequency point priorities of the frequency point based on the different cells includes following operations. In a case that a first cell in the different cells is the current serving cell, a frequency point priority of the frequency point based on the first cell is determined as the first frequency point priority.

In an embodiment, determining the first frequency point priority according to channel qualities of the different cells and the frequency point priorities of the frequency point based on the different cells includes following operations.

At least one second cell meeting a channel quality condition is selected according to the channel qualities of the different cells.

A highest priority in at least one frequency point priority of the frequency point based on the at least one second cell is determined as the first frequency point priority.

Alternatively, a lowest priority in at least one frequency point priority of the frequency point based on the at least one second cell is determined as the first frequency point priority.

Alternatively, an average priority of at least one frequency point priority of the frequency point based on the at least one second cell is determined as the first frequency point priority.

Alternatively, a randomly selected priority from at least one frequency point priority of the frequency point based on the at least one second cell is determined as the first frequency point priority.

In an embodiment, determining the first frequency point priority according to the channel qualities of the different cells and the frequency point priorities of the frequency point based on the different cells includes following operations. A cell with a highest channel quality in the different cells is selected, and a frequency point priority of the frequency point based on the cell with the highest channel quality is determined as the first frequency point priority.

In an embodiment, determining the first frequency point priority according to the beam numbers of the different cells and the frequency point priorities of the frequency point based on the different cells includes following operations.

At least one third cell meeting a beam number condition is selected according to the beam numbers of the different cells.

A highest priority in at least one frequency point priority of the frequency point based on the at least one third cell is determined as the first frequency point priority.

Alternatively, a lowest priority in at least one frequency point priority of the frequency point based on the at least one third cell is determined as the first frequency point priority.

Alternatively, an average priority of at least one frequency point priority of the frequency point based on the at least one third cell is determined as the first frequency point priority.

Alternatively, a randomly selected priority from at least one frequency point priority of the frequency point based on the at least one third cell is determined as the first frequency point priority.

In an embodiment, determining the first frequency point priority according to the beam numbers of the different cells and the frequency point priorities of the frequency point based on the different cells includes following operations. A cell with a largest number of beams in the different cells is selected, and a frequency point priority of the frequency point based on the cell with the largest number of beams is determined as the first frequency point priority.

In an embodiment, determining the first frequency point priority according to the channel qualities of the different cells, the beam numbers of the different cells and the frequency point priorities of the frequency point based on the different cells includes following operations. At least one fourth cell meeting a channel quality condition is selected according to the channel qualities of the different cells. The first frequency point priority is determined according to at least one beam number of the at least one fourth cell and the frequency point priorities of the frequency point based on the different cells.

In an embodiment, determining the first frequency point priority according to the at least one beam number of the at least one fourth cell and the frequency point priorities of the frequency point based on the different cells includes following operations.

At least one fifth cell meeting a beam number condition is selected according to the at least one beam number of the at least one fourth cell.

A highest priority in at least one frequency point priority of the frequency point based on the at least one fifth cell is determined as the first frequency point priority.

Alternatively, a lowest priority in at least one frequency point priority of the frequency point based on the at least one fifth cell is determined as the first frequency point priority.

Alternatively, an average priority of at least one frequency point priority of the frequency point based on the at least one fifth cell is determined as the first frequency point priority.

Alternatively, a randomly selected priority from at least one frequency point priority of the frequency point based on the at least one fifth cell is determined as the first frequency point priority.

In an embodiment, determining the first frequency point priority according to the at least one beam number of the at least one fourth cell and the frequency point priorities of the frequency point based on the different cells includes following operations. A cell with a largest number of beams in the at least one fourth cell is selected, and a frequency point priority of the frequency point based on the cell with the largest number of beams is determined as the first frequency point priority.

In an embodiment, determining the first frequency point priority according to channel qualities of the different cells, the beam numbers of the different cells and the frequency point priorities of the frequency point based on the different cells includes following operations. At least one sixth cell meeting a beam number condition is selected according to the beam numbers of the different cells. The first frequency point priority is determined according to at least one channel quality of the at least one sixth cell and the frequency point priorities of the frequency point based on the different cells.

In an embodiment, determining the first frequency point priority according to at least one channel quality of the at least one sixth cell and the frequency point priorities of the frequency point based on the different cells includes following operations.

At least one seventh cell meeting a channel quality condition is selected according to the at least one channel quality of the at least one sixth cell.

A highest priority in at least one frequency point priority of the frequency point based on the at least one seventh cell is determined as the first frequency point priority.

Alternatively, a lowest priority in at least one frequency point priority of the frequency point based on the at least one seventh cell is determined as the first frequency point priority.

Alternatively, an average priority of at least one frequency point priority of the frequency point based on the at least one seventh cell is determined as the first frequency point priority.

Alternatively, a randomly selected priority from at least one frequency point priority of the frequency point based on the at least one seventh cell is determined as the first frequency point priority.

In an embodiment, determining the first frequency point priority according to at least one channel quality of the at least one sixth cell and the frequency point priorities of the frequency point based on the different cells includes following operations. A cell with a highest channel quality in the at least one sixth cell is selected, and a frequency point priority of the frequency point based on the cell with the highest channel quality is determined as the first frequency point priority.

In an embodiment, determining the first frequency point priority according to whether each of the different cells is a cell other than the current serving cell and the frequency point priorities of the frequency point based on the different cells includes following operations. In a case that at least one cell in the different cells is not a current serving cell, an eighth cell is selected from the at least one cell, and a frequency point priority of the frequency point based on the eighth cell is determined as the first frequency point priority.

In an embodiment, the processing unit 710 is further configured to: perform cell reselection according to the first frequency point priority.

In an embodiment, the first frequency point priority is a reselection priority of the different cells.

In an embodiment, the number of slices is one or more.

In an embodiment, the slice is of any of following levels: cell, frequency point, tracking area or registration area.

In an embodiment, the first frequency point priority is a frequency point priority of the frequency point based on the slice.

In an embodiment, the processing unit 710 is specifically configured to: for the same slice, the same frequency point and different cells, in a case that frequency point priorities of the frequency points based on the different cells are different, determine the first frequency point priority according to the first rule.

Alternatively, in some embodiments, the processing unit may be one or more processors.

It should be understood that the terminal device 700 according to the embodiment of the present disclosure may correspond to the terminal device in the method embodiment corresponding to FIG. 5 and that the above and other operations and/or functions of the various units in the terminal device 700 are used to implement the corresponding flows in the corresponding method embodiment of FIG. 5. For brevity, details are not elaborated herein.

Figure 8:
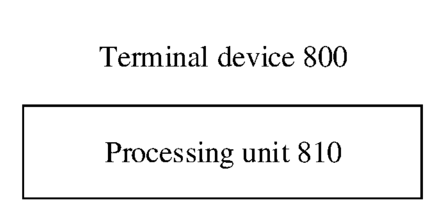
FIG. 8 shows a schematic block diagram of a terminal device 800 according to an embodiment of the present disclosure.

FIG. 8 shows a schematic block diagram of a terminal device 800 according to an embodiment of the present disclosure. As shown in FIG. 8, the terminal device 800 includes a processing unit 810 configured to: for different slices, a same first frequency point and different cells, perform cell reselection according to a second rule. The second rule includes any one of the followings.

When performing the cell reselection, a non-specific cell is excluded. The non-specific cell is a cell not supporting a target slice.

When performing the cell reselection, a reselection priority of the non-specific cell is set to be different from a reselection priority of a specific cell. The specific cell is a cell supporting the target slice.

The cell reselection is performed according to a conventional frequency point priority of the first frequency point.

In an embodiment, excluding the non-specific cell when performing the cell reselection includes following operations. The cell reselection is performed according to frequency point priorities of the first frequency point based on different cells. In a case that a selected cell after the cell reselection is the non-specific cell, the non-specific cell is not selected. In a case that the selected cell after the cell reselection is the specific cell, the specific cell is selected.

In an embodiment, excluding the non-specific cell when performing the cell reselection includes following operations. After excluding the non-specific cell, the cell reselection is performed according to frequency point priorities of the first frequency point based on the different cells.

In an embodiment, excluding the non-specific cell when performing the cell reselection includes following operations. The cell reselection is performed according to a conventional frequency point priority of the first frequency point. In a case that a selected cell after the cell reselection is a non-specific cell, the non-specific cell is not selected. In a case that the selected cell after the cell reselection is a specific cell, the specific cell is selected.

In an embodiment, excluding the non-specific cell when performing the cell reselection includes following operations. After excluding the non-specific cell, the cell reselection is performed according to a conventional frequency point priority of the first frequency point.

In an embodiment, when performing the cell reselection, setting the reselection priority of the non-specific cell to be different from the reselection priority of the specific cell includes any one of the followings.

The reselection priority of the non-specific cell is set to be lower than conventional frequency point priorities of all frequency points or lower than a frequency point priority of a current serving cell.

The reselection priority of the specific cell is set to be higher than the conventional frequency point priority of the first frequency point or a frequency point priority of the first frequency point based on a first slice, herein the first slice is a slice corresponding to the specific cell.

The reselection priority of the non-specific cell is set to be lower than the conventional frequency point priorities of all frequency points or lower than the frequency point priority of the current serving cell, and the reselection priority of the specific cell is set to be the conventional frequency point priority of the first frequency point or the frequency point priority of the first frequency point based on the first slice.

The reselection priority of the non-specific cell is set to be lower than the conventional frequency point priorities of all frequency points or lower than the frequency point priority of the current serving cell, and the reselection priority of the specific cell is set to be higher than the conventional frequency point priority of the first frequency point or the frequency point priority of the first frequency point based on the first slice.

The reselection priority of the non-specific cell is set to be lower than a minimum value of the conventional frequency point priority of the first frequency point and a reselection priority of the current serving cell, and the reselection priority of the specific cell is set to be the conventional frequency point priority of the first frequency point or the frequency point priority of the first frequency point based on the first slice.

The reselection priority of the non-specific cell is set to be lower than one of the conventional frequency point priority of the first frequency point and the reselection priority of the current serving cell, and the reselection priority of the specific cell is set to be the conventional frequency point priority of the first frequency point or the frequency point priority of the first frequency point based on the first slice.

The reselection priority of the non-specific cell is set to be lower than a minimum value of the conventional frequency point priority of the first frequency point and the frequency point priority of the first frequency point based on the first slice, and the reselection priority of the specific cell is set to be higher than or equal to a maximum value of the conventional frequency point priority of the first frequency point and the frequency point priority of the first frequency point based on the first slice.

The reselection priority of the non-specific cell is set to be the minimum value of the conventional frequency point priority of the first frequency point and the frequency point priority of the first frequency point based on the first slice, and the reselection priority of the specific cell is set to be the maximum value of the conventional frequency point priority of the first frequency point and the frequency point priority of the first frequency point based on the first slice.

The reselection priority of the non-specific cell is set to be a minimum value of the conventional frequency point priority of the first frequency point and a frequency point priority of the first frequency point based on a second slice, and the reselection priority of the specific cell is set to be the maximum value of the conventional frequency point priority of the first frequency point and the frequency point priority of the first frequency point based on the first slice, wherein the second slice is a slice corresponding to the non-specific cell.

In an embodiment, the number of slices is one or more.

In an embodiment, the slice is of any of following levels: cell, frequency point, tracking area or registration area.

Alternatively, in some embodiments, the processing unit may be one or more processors.

It should be understood that the terminal device 800 according to the embodiment of the present disclosure may correspond to the terminal device in the corresponding method embodiment of FIG. 6, and the above and other operations and/or functions of the various units in the terminal device 800 are used to implement the corresponding flows in the corresponding method embodiment of FIG. 6. For brevity, details are not elaborated herein.

Figure 9:
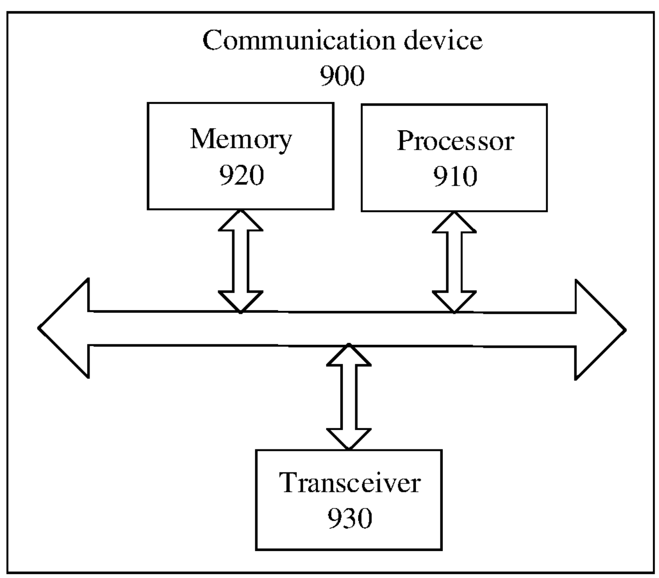
FIG. 9 is a schematic structural diagram of a communication device 900 provided by an embodiment of the present disclosure.

FIG. 9 is a schematic structural diagram of a communication device 900 provided by an embodiment of the present disclosure. The communication device 900 shown in FIG. 9 includes a processor 910 that may invoke and run a computer program from memory to implement the method in the embodiments of the present disclosure.

In an embodiment, as shown in FIG. 9, the communication device 900 may further include a memory 920. The processor 910 may invoke and run a computer program from the memory 920 to implement the method in the embodiments of the present disclosure.

The memory 920 may be a separate device independent of the processor 910 or may be integrated in the processor 910.

In an embodiment, as shown in FIG. 9, the communication device 900 may further include a transceiver 930. The processor 910 may control the transceiver 930 to communicate with other devices, and in particular to transmit information or data to other devices or receive information or data transmitted by other devices.

The transceiver 930 may include a transmitter and a receiver. The transceiver 930 may further include an antenna, the number of the antennas may be one or more.

In an embodiment, the communication device 900 may be specifically a terminal device of the embodiment of the present disclosure, and the communication device 900 may implement corresponding processes implemented by the terminal device in the respective methods of the embodiment of the present disclosure, which will not be elaborated here for the sake of brevity.

Figure 10:
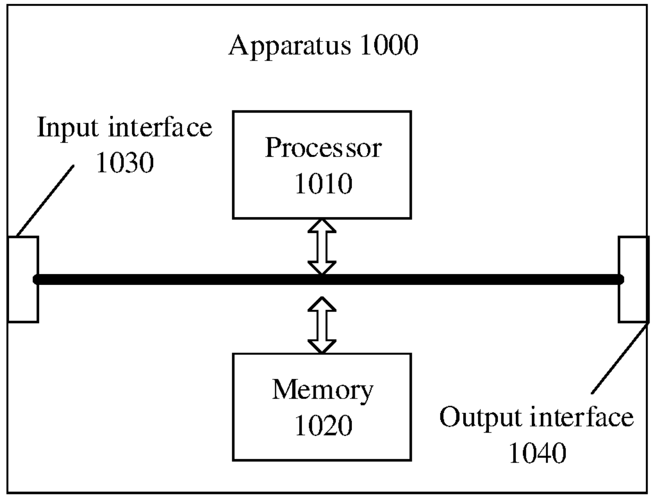
FIG. 10 is a schematic structural diagram of an apparatus according to an embodiment of the present disclosure.

FIG. 10 is a schematic structural diagram of an apparatus according to an embodiment of the present disclosure. The apparatus 1000 shown in FIG. 10 includes a processor 1010 that can invoke and run a computer program from memory to implement the method in the embodiments of the present disclosure.

In an embodiment, as shown in FIG. 10, the apparatus 1000 may further include a memory 1020. The processor 1010 may invoke and run a computer program from the memory 1020 to implement the method in the embodiments of the present disclosure.

The memory 1020 may be a separate device independent of the processor 1010 or may be integrated in the processor 1010.

In an embodiment, the apparatus 1000 may further include an input interface 1030. The processor 1010 may control the input interface 1030 to communicate with other devices or chips, and in particular to obtain information or data sent by other devices or chips.

In an embodiment, the apparatus 1000 may further include an output interface 1040. The processor 1010 may control the output interface 1040 to communicate with other devices or chips, and in particular to output information or data to other devices or chips.

In an embodiment, the apparatus can be applied to the terminal device in the embodiment of the present disclosure, and the apparatus can implement the corresponding processes implemented by the terminal device in the respective methods of the embodiment of the present disclosure, which will not be elaborated here for the sake of brevity.

In an embodiment, the apparatus mentioned in the embodiment of the present disclosure may also be a chip. For example, it can be a system level chip, a system chip, a chip system, a system on chip or the like.

It should be understood that the processor of the embodiment of the present disclosure may be an integrated circuit chip having signal processing capability. In implementation, the operations of the above method embodiments may be accomplished by integrated logic circuitry of hardware in a processor or instructions in the form of software. The processor may be a general purpose processor, a digital signal processor (DSP), an disclosure specific integrated circuit (ASIC), a field programmable gate array (FPGA) or other programmable logic device, a discrete gate or transistor logic device, or a discrete hardware component. The methods, operations, and logical block diagrams disclosed in the embodiments of the present disclosure may be implemented or performed. The general purpose processor may be a microprocessor or the processor may be any conventional processor or the like. The operations of the method disclosed in connection with the embodiments of the present disclosure may be directly performed by a hardware decoding processor, or performed by a combination of hardware and software modules in the decoding processor. The software module may be located in a storage medium mature in the art, such as a random access memory, a flash memory, a read-only memory, a programmable read-only memory, or an electrically erasable programmable memory, a register, or the like. The storage medium is located in the memory, and the processor reads the information in the memory and completes the operations of the method in combination with the hardware.

It is to be understood that the memory in the embodiments of the present disclosure may be a volatile memory or a non-volatile memory, or may include both volatile and non-volatile memory. Herein the non-volatile memory may be a read only memory (ROM), a programmable ROM (PROM), an Erasable PROM (EPROM), an Electrically EPROM (EEPROM) or a flash memory. The volatile memory may be a Random Access Memory (RAM) that functions as an external cache. By way of example, but not limitation, many forms of RAM may be used, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM, (SLDRAM), and a Direct Rambus RAM (DR RAM). It should be noted that the memories of the systems and methods described herein are intended to include, but are not limited to, these and any other suitable types of memories.

It should be understood that the memory described above is exemplary but not limiting, for example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, the memory in the present disclosure embodiment is intended to include, but is not limited to, these and any other suitable types of memory.

Embodiments of the present disclosure further provide a computer-readable storage medium for storing computer programs.

In an embodiment, the computer-readable storage medium may be applied to the network device or the base station in the embodiments of the present disclosure, and the computer programs cause the computer to perform the corresponding flow implemented by the network device or the base station in the methods in the embodiments of the present disclosure. For brevity, details are not elaborated herein.

In an embodiment, the computer-readable storage medium may be applied to the mobile terminal/terminal device in the embodiments of the present disclosure, and the computer programs cause the computer to perform the corresponding flow implemented by the mobile terminal/terminal device in the methods of the embodiments of the present disclosure. For brevity, details are not elaborated herein.

Embodiments of the present disclosure further provide a computer program product including computer program instructions.

In an embodiment, the computer program product may be applied to the network device or the base station in the embodiments of the present disclosure, and the computer program instruction causes the computer to perform the corresponding flow implemented by the network device or the base station in the methods in the embodiments of the present disclosure. For brevity, details are not elaborated herein.

In an embodiment, the computer program product may be applied to the mobile terminal/terminal device in the embodiments of the present disclosure, and the computer program instruction causes the computer to perform the corresponding flow implemented by the mobile terminal/terminal device in the methods of the embodiments of the present disclosure. For brevity, details are not elaborated herein.

Embodiments of the present disclosure further provide a computer program.

In an embodiment, the computer program may be applied to the network device or the base station in the embodiment of the present disclosure. The computer program, when running on a computer, causes computer to perform the corresponding flow implemented by the network device or the base station in the methods in the embodiment of the present disclosure. For brevity, details are not elaborated herein.

In an embodiment, the computer program may be applied to the mobile terminal/terminal device in the embodiments of the present disclosure. The computer program, when running on a computer, causes the computer to perform the corresponding flow implemented by the mobile terminal/terminal device in the methods in the embodiments of the present disclosure. For brevity, details are not elaborated herein.

Those of ordinary skill in the art will appreciate that the units and algorithm operations of the examples described in connection with the embodiments disclosed herein can be implemented in electronic hardware, or a combination of computer software and electronic hardware. Whether these functions are performed in hardware or software depends on the specific disclosure and design constraints of the technical solution. A person skilled in the art may implement the described functions using different methods for each particular application, but such implementation should not be considered beyond the scope of the present disclosure.

Those skilled in the art will clearly understand that for the convenience and brevity of the description, for the specific working process of the system, apparatus and unit described above, reference may be made to the corresponding process in the foregoing method embodiment, and details are not elaborated herein.

In the several embodiments provided herein, it should be understood that the disclosed systems, apparatus, and methods may be implemented in other ways. For example, the apparatus embodiments described above are merely illustrative. For example, the division of the units is merely a logical function division, and may be implemented in other ways. For example, a plurality of units or components may be combined or integrated into another system, or some features may be ignored or not performed. In an embodiment, the displayed or discussed coupling or direct coupling or communication connection may be implemented via some interface, indirect coupling or communication connection among devices or units, and may be in electrical, mechanical or other form.

The units described as separate units may or may not be physically separate, and the units displayed as units may or may not be physical units, i.e. may be located in one place, or may be distributed over a plurality of network units. Some or all of the units may be selected according to actual needs to achieve the objectives of the solutions of the present embodiment.

In addition, each functional unit in various embodiments of the present disclosure may be integrated into one processing unit, or each unit may exist physically separated, or two or more units may be integrated into one unit.

The functions may be stored in a computer-readable storage medium if they are implemented as software functional units and sold or used as stand-alone products. Based on such an understanding, the technical solutions of the present disclosure essentially or the part that makes the contribution to the prior art or part of the technical solutions may be embodied in the form of a software product stored in a storage medium, including several instructions for causing a computer device (which may be a personal computer, a server, a network device, or the like) to perform all or part of the operations of the methods described in the embodiments of the present disclosure. The foregoing storage medium includes a USB flash drive, a removable hard disk, a read-only memory (ROM), a random access memory (RAM), a magnetic disk, an optical disc, or any other medium that can store program code.

The foregoing descriptions are merely specific embodiments of the present disclosure, but the protection scope of the present disclosure is not limited thereto. Any change or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for wireless communication, comprising:

for a same slice, a same frequency point and different cells, in a case that frequency point priorities of the frequency point for the different cells are different, determining a first frequency point priority of the frequency point according to a first rule, wherein the first frequency point priority is used by a terminal device to perform cell reselection;

wherein the first rule comprises:

determining the first frequency point priority according to channel qualities of the different cells and the frequency point priorities of the frequency point for the different cells, comprising:

selecting a cell with a highest channel quality in the different cells, and determining a frequency point priority of the frequency point for the cell with the highest channel quality as the first frequency point priority.

2. The method of claim 1, further comprising:

performing cell reselection according to the first frequency point priority.

3. The method of claim 1, wherein the first frequency point priority is a reselection priority of the different cells.

4. The method of claim 1, wherein the first frequency point priority is a frequency point priority of the frequency point based on the slice.

5. A terminal device, comprising: a processor and a memory for storing a computer program;

wherein the processor is configured to perform following operation: for a same slice, a same frequency point and different cells, in a case that frequency point priorities of the frequency point for the different cells are different, determining a first frequency point priority of the frequency point according to a first rule, wherein the first frequency point priority is used by a terminal device to perform cell reselection;

wherein the first rule comprises:

determining the first frequency point priority according to channel qualities of the different cells and the frequency point priorities of the frequency point for the different cells, comprising:

selecting a cell with a highest channel quality in the different cells, and determining a frequency point priority of the frequency point for the cell with the highest channel quality as the first frequency point priority.

6. The terminal device of claim 5, wherein, the processor is further configured to perform cell reselection according to the first frequency point priority.

7. The terminal device of claim 5, wherein the first frequency point priority is a reselection priority of the different cells.

8. The terminal device of claim 5, wherein the first frequency point priority is a frequency point priority of the frequency point based on the slice.

* * * * *